United States Patent
Liang et al.

(10) Patent No.: US 9,476,187 B2
(45) Date of Patent: Oct. 25, 2016

(54) INNER WATER PIPE ASSEMBLY FOR FAUCET

(71) Applicant: Xiamen Runner Industrial Corporation, Xiamen (CN)

(72) Inventors: De-Sheng Liang, Xiamen (CN); Jing-Ming Li, Xiamen (CN)

(73) Assignee: XIAMEN RUNNER INDUSTRIAL CORPORATION, Xiamen (CN)

( * ) Notice: Subject to any disclaimer, the term of this patent is extended or adjusted under 35 U.S.C. 154(b) by 11 days.

(21) Appl. No.: 14/739,491

(22) Filed: Jun. 15, 2015

(65) Prior Publication Data
US 2016/0047112 A1 Feb. 18, 2016

(30) Foreign Application Priority Data
Aug. 15, 2014 (CN) .................... 2014 2 0459801 U

(51) Int. Cl.
*E03C 1/04* (2006.01)
*F16K 27/02* (2006.01)

(52) U.S. Cl.
CPC ............. *E03C 1/0403* (2013.01); *F16K 27/02* (2013.01); *Y10T 137/6017* (2015.04)

(58) Field of Classification Search
CPC ........... E03C 1/0403; E03C 2001/026; Y10T 137/6017; F16K 27/02
USPC ............................................ 137/315.13, 801
See application file for complete search history.

(56) References Cited

U.S. PATENT DOCUMENTS

| | | | |
|---|---|---|---|
| 8,453,669 B2 * | 6/2013 | Veros et al. .............. | E03C 1/04 137/315.13 |
| 2011/0126932 A1 * | 6/2011 | Chan .................. | F16K 11/0746 137/801 |
| 2013/0186482 A1 * | 7/2013 | Veros et al. .............. | E03C 1/04 137/315.13 |

* cited by examiner

*Primary Examiner* — Kevin Lee
*(74) Attorney, Agent, or Firm* — Chun-Ming Shih

(57) ABSTRACT

An inner water pipe assembly for faucet includes a copper shell with a longitudinal channel and a lateral channel. A valve seat is mounted in the longitudinal channel, and includes an inlet channel, an outlet channel, and a seat hole formed there through. A valve sleeve is fitted into the lateral channel, and has an inlet notch communicating with the inlet channel, a chamber inside the valve seat and an annular inlet passage formed between the valve sleeve and a valve. The valve is fitted into the pipe sleeve for water passage control. A valve chamber inside the valve communicates with the outlet channel of the valve seat and a water inlet formed through a periphery of the valve. The inner water pipe assembly provides a rational design reducing the copper material and cost in production, simplifying the manufacture, and resolving excessive heavy metal in drinking water.

5 Claims, 4 Drawing Sheets

INNER WATER PIPE ASSEMBLY FOR FAUCET

BACKGROUND OF THE INVENTION

1. Field of the Invention

The present invention relates to a faucet and, more particularly, to an inner water pipe assembly for faucet.

2. Description of the Related Art

Conventional faucets have an inlet water pipe and an outlet water pipe integrally formed with a copper shell. The copper shell requires a great deal of copper and thus significantly increase the cost of the faucet in production. As the water pipes are also made of copper, drinking water passing though the water pipes contains high percentage of heavy metal against the health of human body. That will harm user's health. Also because the shell is more structurally complicated, it's harder to manufacture the conventional faucets.

SUMMARY OF THE INVENTION

In view of the problems and drawbacks of the prior art, the objective of the present invention is to provides an inner water pipe assembly for faucet.

To achieve the foregoing objective, the inner water pipe assembly for faucet includes a shell, a valve seat, a valve sleeve, a valve and an annular inlet passage.

The shell has a longitudinal channel, a lateral channel and a rotary portion.

The longitudinal channel is defined inside the shell in a longitudinal direction.

The lateral channel is defined inside the shell in a lateral direction and has an outer opening.

The rotary portion is connected with the outer opening of the lateral channel.

The valve seat is mounted inside the longitudinal channel of the shell, and has an inlet channel, an outlet channel and a valve-mounting hole, The valve-mounting hole is formed through a peripheral wall of the valve seat and communicates with the inlet channel and the outlet channel.

The valve sleeve has a first end, a second end and an inlet notch.

The first end is fitted into the lateral channel.

The inlet notch is formed through a portion of the second end of the valve sleeve to communicate with the inlet channel of the valve seat and a chamber defined inside the valve sleeve.

The valve is fitted into the valve sleeve, controls water to pass or not to pass through the valve, and has a valve chamber and a water inlet.

The valve chamber is defined inside the valve and communicates with the outlet channel of the valve seat.

The water inlet is formed through the peripheral wall of the valve, and communicates with the valve chamber.

The annular inlet passage is formed between a peripheral wall of the valve and an inner wall of the valve sleeve and communicates with the outlet channel of the valve seat and the water inlet of the valve.

Preferably, the valve further has a fixed valve diaphragm, a movable valve diaphragm and a valve stem.

The fixed valve diaphragm is mounted inside the valve chamber.

The movable valve diaphragm is mounted inside the valve chamber and adjoins the fixed valve diaphragm.

One end of the valve stem is mounted in the valve chamber and is securely connected with the movable valve diaphragm, and the other end of the valve stems penetrates through one end of the lateral channel distal to the longitudinal channel and is inserted into the rotary portion to be rotatable with the rotary portion of the shell.

Preferably, the shell further has a handle securely mounted on a periphery of the rotary portion by threaded connection and protruding along a radial direction with respect to the rotary portion.

Preferably, the outlet pipe is mounted through a top opening of the longitudinal channel of the shell and is detachably connected with the outlet channel by threaded connection to hermetically seal the outlet channel, and the inlet pipe is detachably connected with a bottom opening of the inlet channel by threaded connection.

Preferably, the valve further has a first collar seal, a second collar seal and a third collar seal.

The first collar seal is mounted between a peripheral edge portion of the second end of the valve and a portion of an inner wall of the valve-mounting hole facing the second end of the valve to form a hermetic seal between the valve and the valve-mounting hole.

The second collar seal is mounted between the peripheral wall of the valve sleeve and the inner wall of the valve-mounting hole to form a hermetic seal between the valve sleeve and the inner wall of the valve-mounting hole.

The third collar seal is mounted between the peripheral wall of the valve and an inner wall of the valve sleeve to hermetically seal the annular inlet passage.

According to the foregoing description, the present invention has the advantages that inner water pipe assembly for faucet provides a structure with the inner water pipe assembly separated from the faucet body instead of the integrally formed structure in conventional faucets.

Additionally, the present invention provides a rational design reducing the copper material and cost in production, simplifying the manufacture, and resolving excessive heavy metal in drinking water.

Further scope of the applicability of the present invention will become apparent from the detailed descriptions given hereinafter. However, it should be understood that the detailed descriptions and specific examples, while indicating preferred embodiments of the present invention, are given by way of illustration only, since various changes and modifications within the spirit and scope of the present invention will become apparent to those skilled in the art from this detailed descriptions.

BRIEF DESCRIPTION OF THE DRAWINGS

The detailed description of the drawings particularly refers to the accompanying figures in which.

DETAILED DESCRIPTION OF THE INVENTION

The purpose, construction, features, functions and advantages of the present invention can be appreciated and understood more thoroughly through the following detailed description with reference to the attached drawings.

Figure 1:
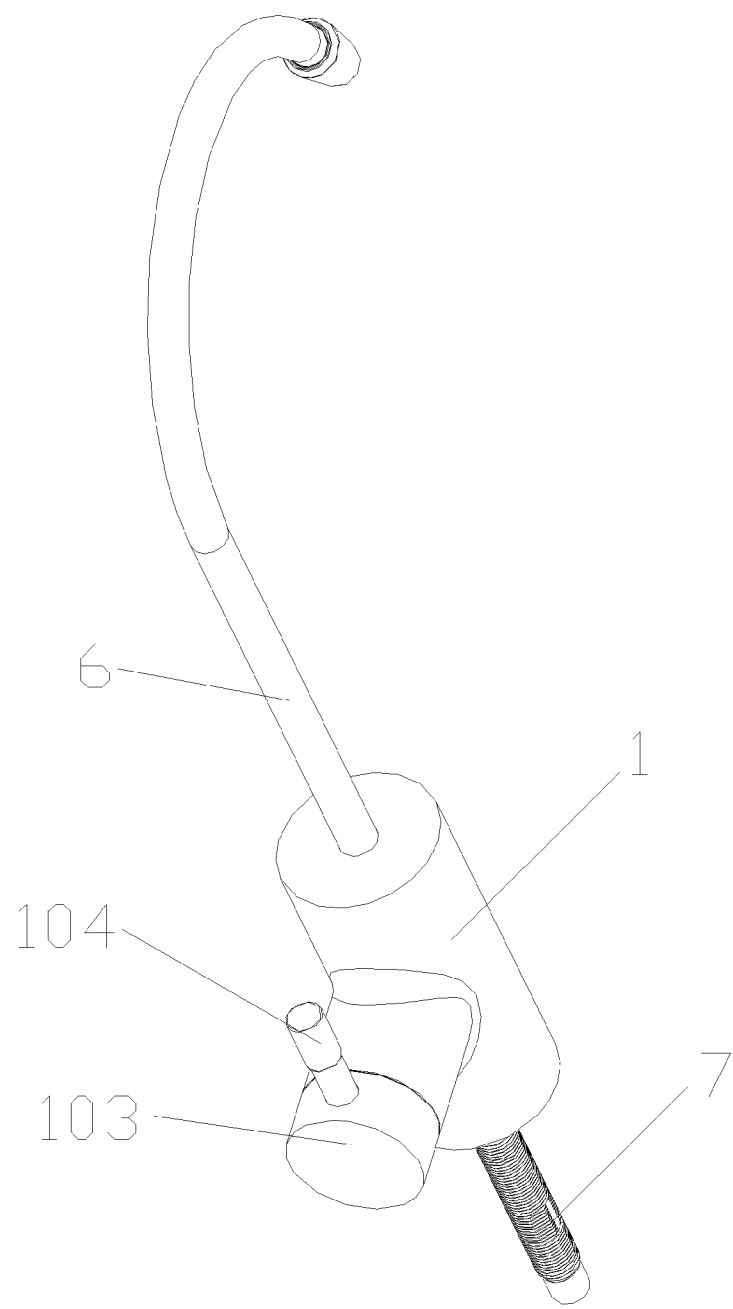
FIG. 1 is a perspective view of an inner water pipe assembly for faucet in accordance with the present invention.
Figure 2:
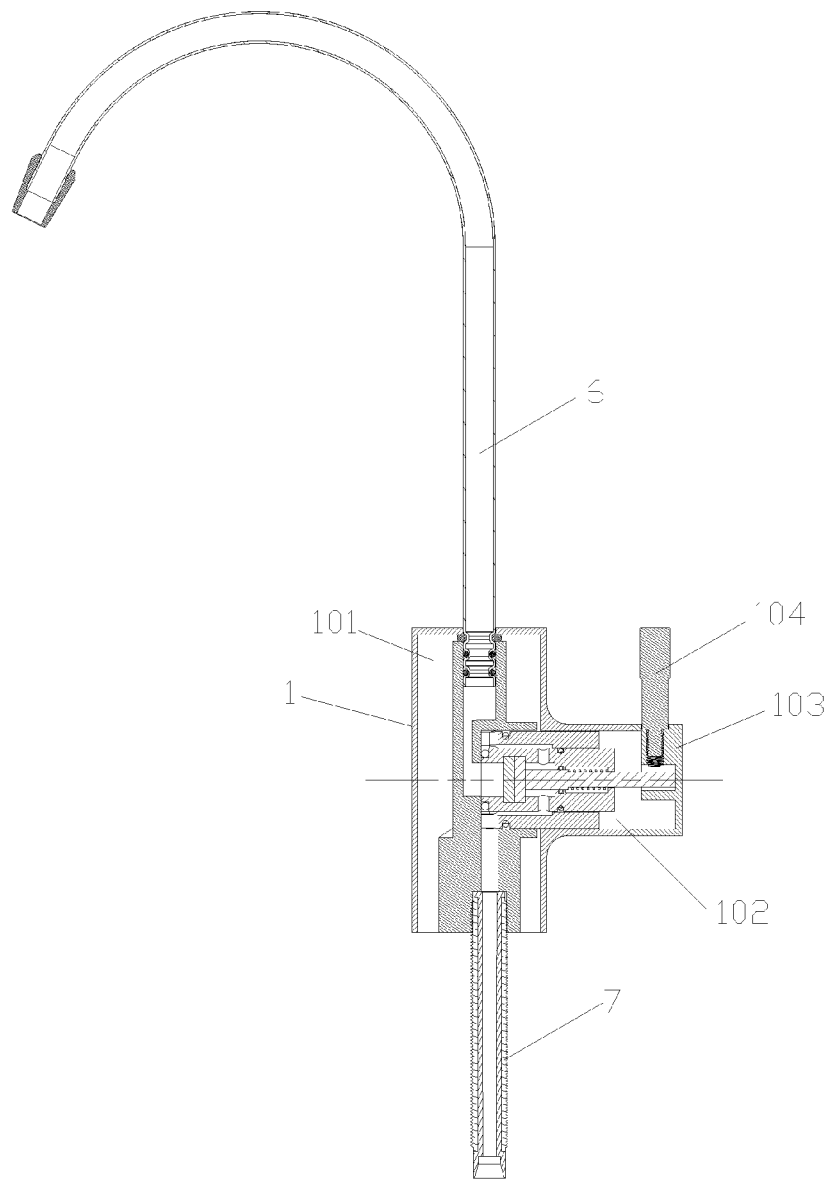
FIG. 2 is a cross-sectional view of the inner water pipe assembly for faucet in FIG. 1.
Figure 3:
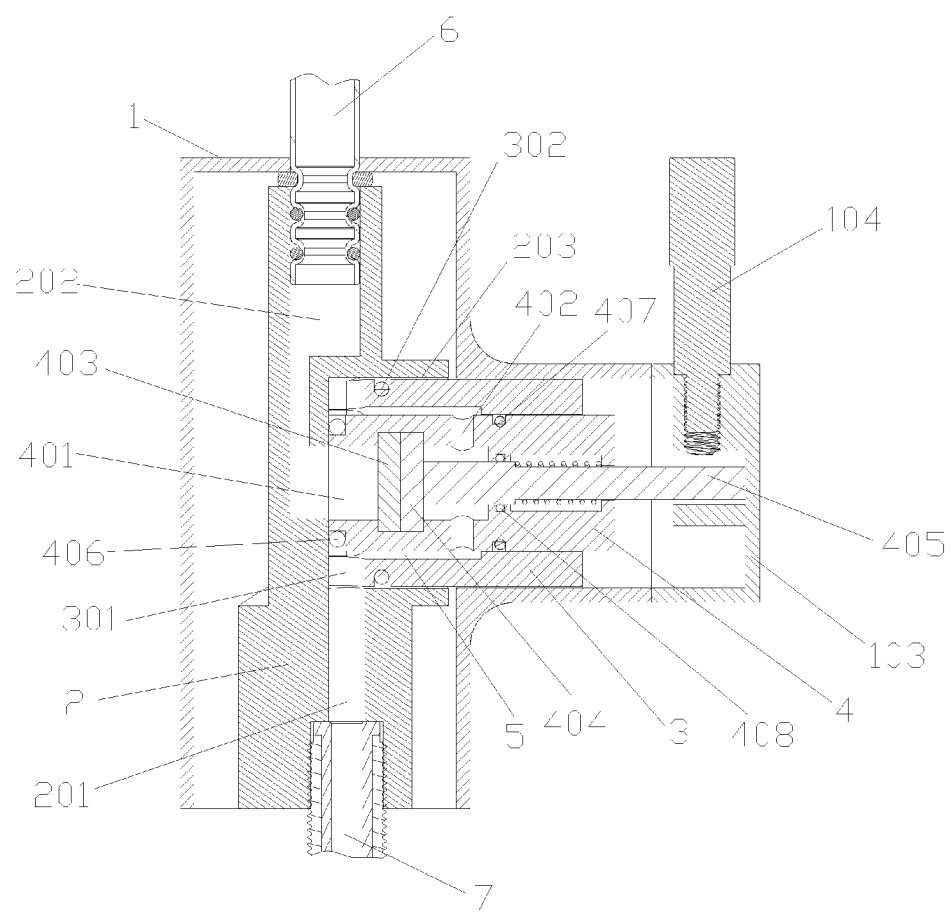
FIG. 3 is a partially enlarged cross-sectional view of the inner water pipe assembly in FIG. 2.
Figure 4:
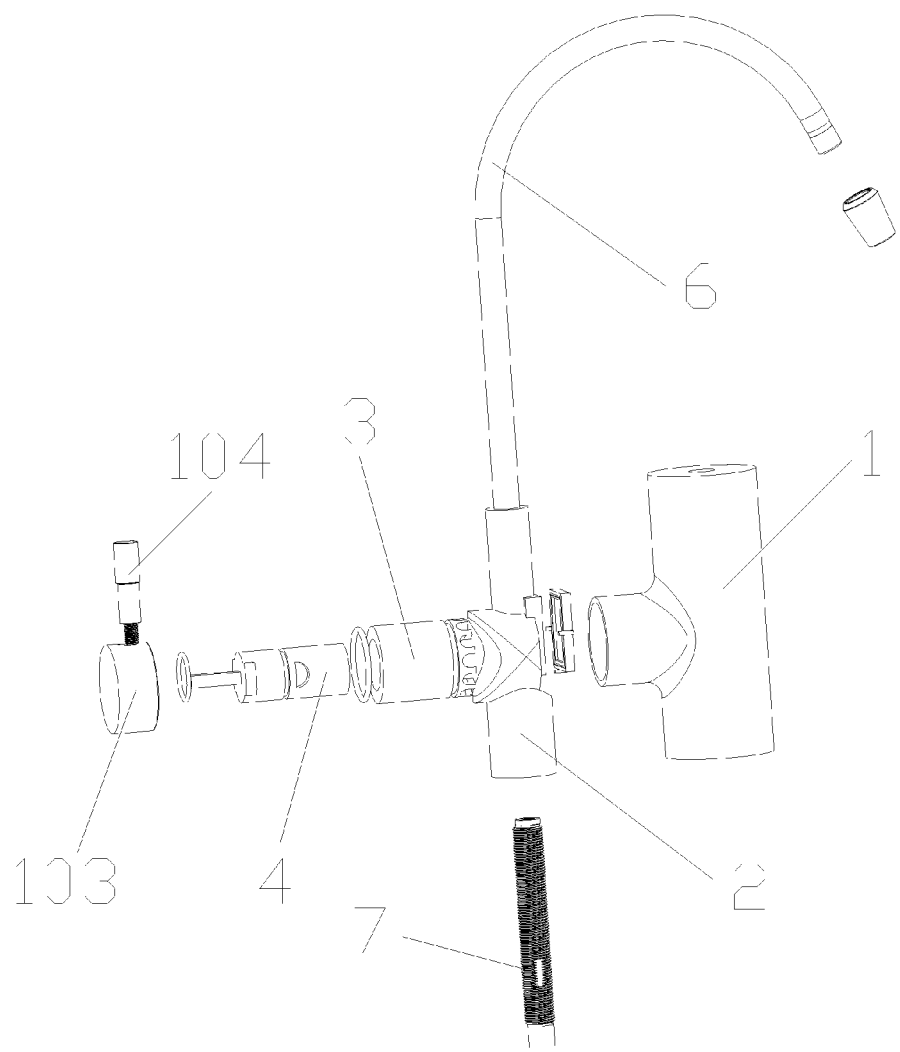
FIG. 4 is an exploded perspective view of the inner water pipe assembly in FIG. 1.

With reference to FIGS. 1-4, an inner water pipe assembly for faucet includes a shell 1, a valve seat 2, a valve sleeve 3, a valve 4, an annular inlet passage 5, an outlet pipe 6, and an inlet pipe 7.

The shell 1 is made of copper and includes a longitudinal channel 101, a lateral channel 102, a rotary portion 103, and a handle 104. The longitudinal channel 101 is defined inside the shell 1 in a longitudinal direction. The lateral channel 102 is formed inside the shell in a lateral direction to communicate with the longitudinal channel 101 and has an outer opening. The rotary portion 103 is connected with the outer opening of the lateral channel 102.

The valve seat 2 is mounted inside the longitudinal channel 101 of the shell 1, includes an inlet channel 201 and an outlet channel 202 formed in a longitudinal direction, and is made from non-toxic plastic for reducing the heavy metal content.

The valve seat 2 further has a valve-mounting hole 203 formed through a peripheral wall of the valve seat 2 and communicating with the inlet channel 201 and the outlet channel 202.

A first end of the valve sleeve 3 is tightly fitted into the lateral channel 102 and a second end of the valve sleeve 3 is tightly fitted into the valve-mounting hole 203.

The valve sleeve 3 has an inlet notch 301 formed through a portion of the second end of the valve sleeve 3 to communicate with the inlet channel 201 of the valve seat 2 and a chamber defined inside the valve sleeve 3.

The valve 4 is fitted into the valve sleeve 3 and control water to pass or not to pass through the valve 4, and has a valve chamber 401 and a water inlet 402.

The annular inlet passage 5 is formed between a peripheral wall of the valve 4 and an inner wall of the valve sleeve 3 and communicates with the outlet channel 202 of the valve seat 2.

The valve chamber 401 is defined inside the valve 4 and communicating with the outlet channel of the valve seat 2. The water inlet 402 is formed through the peripheral wall of the valve 4, and communicates with the valve chamber 401 and the annular inlet passage 5.

The shell 1 is made of copper, and the valve seat 2 is made from non-toxic plastic. As the inlet channel 201 and the outlet channel 202 are both formed in the valve seat 2 and the valve sleeve 3 is used to change water path, the shell 1 just serves for the purpose of protection and support functions.

Therefore, the copper content of the shell 1 is reduced, and so is the amount of heavy metal.

According to the foregoing description, the present invention resolves the problems of copper used more than needed and high percentage of heavy metal in drinking water. Meanwhile, the manufacture of the shell 1 of the faucet is simplified and the production cost of the faucet can be further lowered.

In the present embodiment, the inlet notch 301 is U-shaped and is formed through a peripheral wall of the valve sleeve 3 in a circumferential direction. The valve 4 further has a fixed valve diaphragm 403, a movable valve diaphragm 404, and a valve stem 405. The fixed valve diaphragm 403 and the movable valve diaphragm 404 are mounted inside the valve chamber 401, adjoin each other, and all have multiple water holes formed there through. One end of the valve stem 405 is mounted in the valve chamber 401 and is securely connected with the movable valve diaphragm 404. The other end of the valve stems 405 penetrates through one end of the lateral channel 102 distal to the longitudinal channel 101 and is inserted into the rotary portion 103 to be rotatable with the rotary portion 103. The handle 104 is securely mounted on a periphery of the rotary portion 103 by threaded connection and protrudes along a radial direction with respect to the rotary portion 103.

When the handle 104 is rotated, the valve stem 405 then drives the movable valve diaphragm 404 to rotate for the water holes of the fixed valve diaphragm 403 and the movable valve diaphragm 404 to coincide with each other or to be misaligned, such that water can or cannot pass through the valve 4.

The valve stem 405 further has a compression spring mounted around the valve stem 405 to ensure that the movable valve diaphragm 404 abuts against the fixed valve diaphragm 403 to achieve high air tightness when the valve stem 405 pushes against the movable valve diaphragm 404.

The outlet pipe 6 is mounted through a top opening of the longitudinal channel 101 of the shell 1 and is detachably connected with the outlet channel 202 by threaded connection to hermetically seal the outlet channel 202.

The inlet pipe 7 is detachably connected with a bottom opening of the inlet channel 201 by threaded connection.

The valve 4 further has a first collar seal 406, a second collar seal 302, a third collar seal 407 and a fourth collar seal 408. The first collar seal 406 is mounted between a peripheral edge portion of the second end of the valve 4 and a portion of an inner wall of the valve-mounting hole 203 facing the second end of the valve 4 to form a hermetic seal between the valve 4 and the valve-mounting hole 203.

The second collar seal 302 is mounted between the peripheral wall of the valve sleeve 3 and the inner wall of the valve-mounting hole 203 to form a hermetic seal between the valve sleeve 3 and the inner wall of the valve-mounting hole 203. The third collar seal 407 is mounted between the peripheral wall of the valve 4 and an inner wall of the valve sleeve 3 to hermetically seal the annular inlet passage 5.

The fourth collar seal 408 is mounted between an inner wall of the valve chamber 401 of the valve 4 and the peripheral wall of the valve stem 404 to hermetically seal the valve chamber 401.

What is claimed is:
1. An inner water pipe assembly for faucet comprising:
a shell having:
   a longitudinal channel defined inside the shell in a longitudinal direction;
   a lateral channel defined inside the shell in a lateral direction and having an outer opening; and
   a rotary portion connected with the outer opening of the lateral channel;
a valve seat mounted inside the longitudinal channel of the shell, and having:
   an inlet channel;
   an outlet channel; and
   a valve-mounting hole formed through a peripheral wall of the valve seat and communicating with the inlet channel and the outlet channel;
a valve sleeve having:
   a first end fitted into the lateral channel;
   a second end; and
   an inlet notch formed through a portion of the second end of the valve sleeve to communicate with the inlet channel of the valve seat and a chamber defined inside the valve sleeve;
a valve fitted into the valve sleeve, controlling water to pass or not to pass through the valve, and having:

a valve chamber defined inside the valve and communicating with the outlet channel of the valve seat; and a water inlet formed through the peripheral wall of the valve, and communicating with the valve chamber; and an annular inlet passage formed between a peripheral wall of the valve and an inner wall of the valve sleeve and communicating with the outlet channel of the valve seat and the water inlet of the valve.

2. The inner water pipe assembly for faucet as claimed in claim 1, wherein the valve further has:

a fixed valve diaphragm mounted inside the valve chamber;

a movable valve diaphragm mounted inside the valve chamber and adjoining the fixed valve diaphragm; and a valve stem, wherein one end of the valve stem is mounted in the valve chamber and is securely connected with the movable valve diaphragm, and the other end of the valve stem penetrates through one end of the lateral channel distal to the longitudinal channel and is inserted into the rotary portion to be rotatable with the rotary portion of the shell.

3. The inner water pipe assembly for faucet as claimed in claim 2, wherein the shell further has a handle securely mounted on a periphery of the rotary portion by threaded connection and protruding along a radial direction with respect to the rotary portion.

4. The inner water pipe assembly for faucet as claimed in claim 1, wherein an outlet pipe is mounted through a top opening of the longitudinal channel of the shell and is detachably connected with the outlet channel by threaded connection to hermetically seal the outlet channel, and the inlet pipe is detachably connected with a bottom opening of the inlet channel by threaded connection.

5. The inner water pipe assembly for faucet as claimed in claim 1, wherein the valve further has:

a first collar seal mounted between a peripheral edge portion of the second end of the valve and a portion of an inner wall of the valve-mounting hole facing the second end of the valve to form a hermetic seal between the valve and the valve-mounting hole;

a second collar seal mounted between the peripheral wall of the valve sleeve and the inner wall of the valve-mounting hole to form a hermetic seal between the valve sleeve and the inner wall of the valve-mounting hole; and a third collar seal mounted between the peripheral wall of the valve and an inner wall of the valve sleeve to hermetically seal the annular inlet passage.

\* \* \* \* \*